Figure 1:
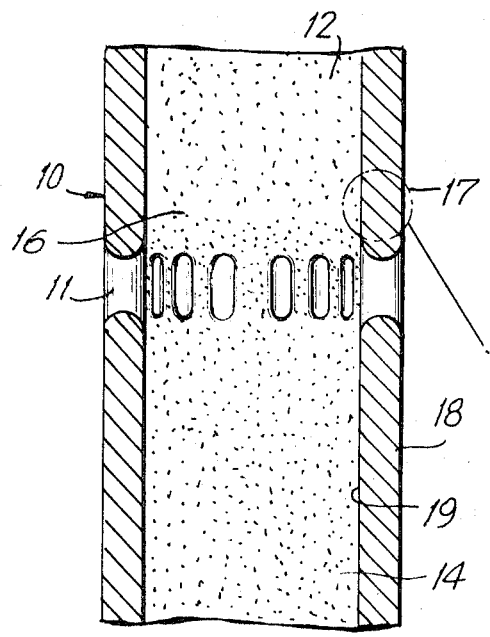
Figure 2:
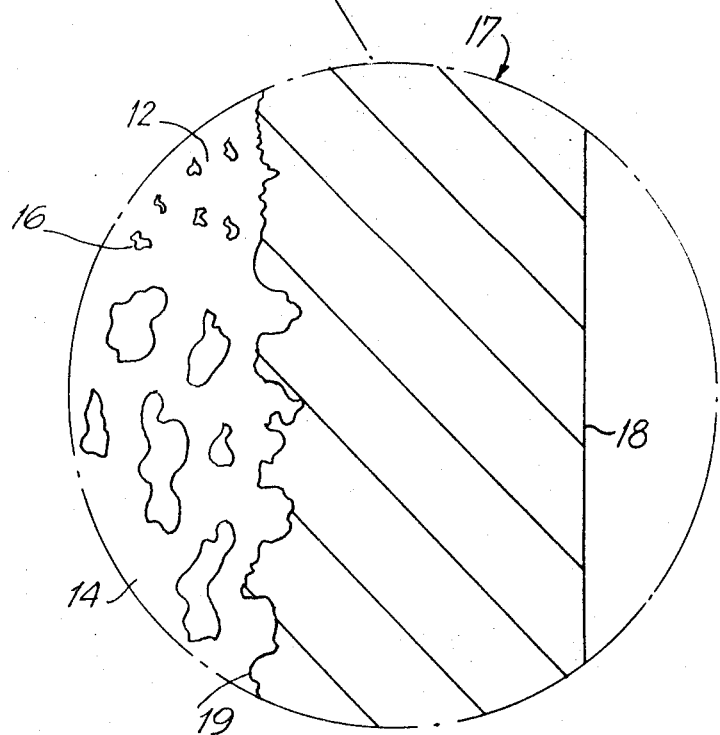

United States Patent
Schweikher

[15] 3,657,078
[45] Apr. 18, 1972

[54] METHOD OF PRODUCING CYLINDER LINERS WITH DIFFERENT DEGREES OF ROUGHNESS IN HIGH AND LOW PRESSURE AREAS

[72] Inventor: Ernest W. Schweikher, Waterbury, Conn.
[73] Assignee: Chromium Corporation of America, Waterbury, Conn.
[22] Filed: July 30, 1969
[21] Appl. No.: 854,345

[52] U.S. Cl. .................................. 204/35 R, 123/193 C
[51] Int. Cl. ................................................ C23f 17/00
[58] Field of Search .......... 204/35 R, 26; 117/97; 51/290; 123/191 A, 193 C

[56] References Cited

UNITED STATES PATENTS

| | | | |
|---|---|---|---|
| 2,314,604 | 3/1943 | Van der Horst | 204/26 |
| 2,412,698 | 12/1946 | Van der Horst | 204/35 R |
| 2,577,818 | 12/1951 | Shaw | 51/290 |

FOREIGN PATENTS OR APPLICATIONS 148,208   3/1948   Australia..............................204/35 R Primary Examiner—John H. Mack
Assistant Examiner—W. I. Solomon
Attorney—Lewis C. Brown, Kenneth G. Wheeless and Robert P. Grindle

[57] ABSTRACT

A lining is provided for an internal combustion engine cylinder in which different degrees of roughness are imparted to those portions of the lands of the liner surface subjected to low and high pressures. The lands of the low pressure portions of the cylinder liner have a high degree of roughness for providing lubrication pockets for cooling the compression rings and for providing lapping of the rings during break-in so as to conform those surfaces in relative movement with each other. The lands of the high pressure portions of the cylinder liner have a low degree of roughness for reducing the oil retaining capacity thereof adjacent the combustion chamber for in turn eliminating the burning of lubricating oil while simultaneously presenting a relatively smooth surface to the compression rings during the time they are under high pressure in order to eliminate cocking of the rings and scoring of the liner.

7 Claims, 2 Drawing Figures

PATENTED APR 18 1972   3,657,078

INVENTOR.
ERNEST W. SCHWEIKHER

BY
Robert P. Grindle
ATTORNEY

METHOD OF PRODUCING CYLINDER LINERS WITH DIFFERENT DEGREES OF ROUGHNESS IN HIGH AND LOW PRESSURE AREAS

Generally speaking, this invention relates to the surface characteristics imparted to the internal liner surface of internal combustion engine cylinders. More particularly, this invention relates to such liners in which the lining has dual characteristics in that the lands of the lining surface are provided with different degrees of roughness in the low and high pressure portions thereof. For example, the low pressure portions of the cylinder liner have imparted thereto a high degree of roughness to the surface while those portions of the same cylinder liner subjected to high pressure have imparted thereto a low degree of roughness to the surface.

In internal combustion engine cylinders, the wear life of such cylinders depends to a large extent upon what happens to them during the first break-in period of the cylinder liner. For example, because of the relative movement of the combustion rings sliding up and down the surface of the liner, if these surfaces are not properly lubricated the rings will have a tendency to score the lining surface immediately upon use. Furthermore, the surfaces of the relative movable parts have a tendency to conform to each other. If this conformity takes place under conditions where there is uneven wear then the cylindrical nature of the liner bore will be deformed immediately upon use and such deformity will continue throughout the life of the liner.

If the wear is uneven and if undue scoring of the liner takes place the wear will continue at an accelerated pace thus reducing the life of the liner.

In addition, problems may arise in the high pressure end of the cylinder where the compression rings are exposed to the high pressure. Because of this, the rings have a tendency to cock under the influence of the high pressure, particularly if the surfaces against which they are moving are too rough. In addition, in the high pressure end of the cylinder, if it is attempted to overcome this cocking problem by the application of sufficient lubrication to overcome it, then a large quantity of the lubricating oil is exposed to the combustion chamber of the cylinder and is burned, thus causing the problem of cylinders requiring a great deal of lubricating oil in order to be maintained properly. On the other hand, if an insufficient amount of lubricating oil is utilized at the moment when the compression rings are exposed to high pressure then the compression rings will cock and score the cylinder to the extent where wear of the cylinder liner in this area is accelerated to a large degree.

As is well known in the art, a degree of porosity is imparted to cylinder liner surfaces so that the individual minute pockets of the liner caused by the impartation of porosity thereto hold a substantial quantity of lubricating oil so as to provide an enhanced lubricated surface for lubricating the relative movement between the compression rings and the cylinder liner surface. However, the problem arises, as noted above, that if the porosity is such that sufficient lubrication is provided for the relative movable parts then an increased amount of lubricating oil is burned in the compression chamber portion of the cylinder which makes for an engine cylinder which requires a large amount of lubricating oil in order to operate properly, thus increasing the cost of operation thereof. In addition, with such a porous surface which is sufficiently porous to provide the required lubrication, the surface characteristics of such a liner are such as to cause more rapid wear simply because the compression rings are worn down more rapidly and there is an initial conforming between the relatively movable surfaces which is slightly at an angle to the vertical axis of the cylinder bore so as to provide an initial deformity of the cylinder bore which increases the wear of the cylinder and accelerates the wear throughout the use thereof.

By contrast, if a relatively smooth low porosity surface is utilized there is reduced lubricating oil retention in the cylinder liner surface adjacent the low pressure end, and therefore the cylinder has a tendency to run hot because there is not sufficient oil in the low pressure portion of the cylinder to cool the rings during that portion of the movement of the piston, from the heat which they pick up at the high pressure combustion end of the cylinder. In addition, with such a smooth surface there is a tendency for the relative movable parts not to work in or conform to each other during initial operation so that there is initial scoring of the cylinder liner. This in turn causes substantial wear to the cylinder liner in that portion thereof against which the compression rings move with subsequent increase in lubricating oil consumption to an uneconomical level.

Thus, the problem arises where the choice of the degree of porosity imparted to a cylinder liner provides certain enhanced properties to the liner for certain purposes while at the same time causing certain difficulties. Therefore, in the past, the degree of porosity imparted to such cylinder liners was selected as a compromise between the desired effects achieved in a low porosity liner and those achieved in a high porosity liner. Such compromise, however, necessitates incorporating into such liners certain undesirable characteristics, as noted above, which ultimately affect the wear life of the liner.

In the past, many attempts have been made to overcome the problems noted above by imparting to the cylinder liner surface varying types and degrees of porosity and surfaces of a pitted nature which would provide the degree of porosity required to give enhanced lubricating oil retention while at the same time overcoming the difficulties of a high porosity surface. For example, chromium plated liner surfaces have been provided by first chromium plating a metallic substrate and thereafter pitting the plated surface by chemical or mechanical means in order to provide the pitted surfaces, the pits of which serve to retain lubricating agent. Furthermore, attempts have been made to utilize the reaction product from chemical etching of such surfaces as a lubricating film on the etched bearing surface.

In addition, attempts have been made to sand blast the metallic substrate of the cylinder prior to plating and thereafter plating with chromium in order to provide reduced friction between that surface and another surface relatively movable therewith. However, whatever the configuration of the final pitted surface achieved by all of these prior art methods, the degree of porosity imparted to the surface still presented certain drawbacks depending upon the amount of porosity obtained with a relatively smooth surface giving the results noted above and at the same time the disadvantages, while a relatively porous surface gave certain advantages such as oil retention while increasing the wear of the cylinder lining under certain conditions as noted above.

Also, attempts have been made to correct or compensate for the problems arising in scoring with the use of relatively smooth and low porosity surfaces by first providing a pitted chromium plated liner for such cylinders as noted herein. Thereafter, the lands disposed between the individual pits of the surface are sand blasted in order to provide on the relatively smooth surfaces of the lands minute asperities which serve to provide the desired working in of the compression ring surfaces moving against this cylinder liner surface so as to eliminate the initial breaking-in scoring of relatively smooth cylinder liners. However, with such an arrangement, certain disadvantages may arise because the relatively smooth surface still has a low lubrication oil retention capacity thus requiring in the life of such a cylinder liner a high degree of lubrication oil consumption.

Further attempts have been made to compromise between the dual requirements noted above for cylinder liners by the incorporation therein of a liner in which the high pressure combustion area of the liner has disposed therein a higher degree of porosity than those low pressure areas of the liner. With such an arrangement, certain advantages are achieved in that there is a high degree of oil retention in the high pressure area thus reducing the tendency of the compression rings to score while moving over the surface of the high pressure area of the cylinder liner. In addition, with such an arrangement, there is a reduced oil retention in the low pressure area, thus reducing the oil ring requirements therefor and controlling the oil consumption in that area.

However, certain disadvantages may result with such an arrangement in that with the high degree of oil retention in or adjacent to the high pressure and/or combustion area of the cylinder there is a high degree of oil consumption after a certain amount of use of the cylinders simply because the oil is burned in the high pressure, high temperature area of the cylinder. In addition, because of this high temperature development in the high pressure area of the cylinder, the rings have a tendency to become heated when they are in that area, and with the relatively low retention of oil in the low pressure area the rings are not cooled sufficiently during their path of movement in that portion of the cylinder and as a result the cylinder has a tendency to become overheated in operation.

This is particularly true because as the result of design changes which have increased the engine horsepower output of internal combustion engines in the past few years, internal pressures have become markedly higher, and the performance of metallic plated cylinder liners, as measured in length of life to condemning wear limits has been significantly reduced. This loss of service life is the result of the wear pattern introduced in the break-in period. The high internal pressures, coupled with the drag between the compression rings and the cylinder liner, result in cocking of the compression ring grooves adjacent the high pressure areas. This cocking of the ring effectively scrapes away the film of lubricating oil and wear starts immediately. This incipient wear pattern induced in the area of highest internal pressures during the break-in period, prevents from then on a flat ring to cylinder wall contact. The sharp, edgewise ring-cylinder contact so indicated continues through the life of the liner, which then wears at an accelerated rate, as noted above.

According to this invention, by contrast, there is provided the application to internal combustion cylinder liners different roughness characteristics as determined by a profilometer, and measured on a RMS (root mean square) scale, on areas of the bore of such cylinders subject to different conditions of temperature and pressure. More specifically, it relates to a reduction of the RMS (smoother finish) in those sectors of the bore where high internal pressures result in high pressures between the cylinder wall and the compression ring. This invention may be further described as the application of a higher degree of roughness on the lands between the pores of the working surface to seat the piston rings in the low pressure segments of the cylinder, and a relatively smooth surface on the lands with minimum wear tendency in the high pressure sectors of the cylinder. Further, with such an arrangement, there is increased oil retention in the low pressure areas of the cylinder which, because of the higher amount of oil maintained in this area, will cool the compression rings when they are adjacent this area. Also, because of the higher degree of roughness in this area, the compression rings will have a tendency during the initial break-in period to conform the surfaces thereof to the surfaces of the cylinder liner against which they are moving or rubbing. Furthermore, in the high pressure areas of the cylinder the compression rings will be moving against a much smoother surface, thus reducing the tendency to score in this area. Because of this smoother surface, the tendency for the piston rings to cock when subjected to high pressure in the high pressure end of the cylinder will be reduced because of the smooth surface against which they are moving. In addition, with reduced oil retention in the high pressure area adjacent the combustion end of the cylinder, there is much less tendency for excessive lubricating oil to be burned from the heat of the combustion.

Accordingly, it is one object of this invention to provide an internal combustion engine cylinder liner which effectively compromises between the dual requirements noted above for such liners. In addition, it is another object of this invention to produce such cylinder liners which effectively reduce the lubricating oil requirements of such cylinders both during the initial break-in period and during the entire life of the use of the cylinder.

It is a further object of this invention to produce such cylinders in which the effective wear life is substantially increased. It is a further object of this invention to produce such internal combustion engine cylinder liners in which scoring of the liner by the compression rings is effectively reduced and/or eliminated both during the break-in period and during the life of the cylinder liner.

With the foregoing and additional objects in view, this invention will be described in more detail and other objects and advantages will be apparent from the following description and the appended claims.

Before describing this invention in more detail, it may be well to note that this invention has been found applicable to a wide variety of internal combustion cylinder liners including those which may be used in diesel engines for locomotives, marine applications, stationary installations and trucks, as well as automobile internal combustion engines.

For example, satisfactory results have been achieved in accordance herewith, and under satisfactorily and economically attractive conditions on commercial scale operations by providing a dual bore finish for a liner in an internal combustion engine cylinder for a railroad locomotive, with the dual bore being measured in microns RMS. The lands of the low pressure portion of the cylinder liner are provided with a coarse micron RMS surface in the range of between about 0.375–2.0 microns, as measured by a profilometer which automatically measures the surface roughness, as well known. With such an arrangement, the compression rings in the low pressure portion of the cylinder are gently lapped to a perfect liner-ring fit, necessary to good lubricating oil control.

Furthermore, the lands of the upper or high pressure portion of the liner are provided with a low micron RMS surface in the range of between about 0.025– 0.375 microns. With such an arrangement, the compression ring in this area will have a minimum drag against the cylinder wall, while simultaneously having a reduced tendency to cock in the ring groove while under the influence of the high pressure in this area and will maintain a flat ring to cylinder wall contact area. With this arrangement, therefore, the initial and continuing wear in the upper, high pressure section of the cylinder liner will be eliminated.

In considering generally the conditions for achieving the most enhanced result in connection herewith, which conditions are more specifically set forth below, one may note that satisfactory internal combustion cylinder liners are produced in accordance herewith by having the dividing line between the low surface roughness-high pressure end of the liner and the high surface roughness-low pressure end of the liner being substantially at that point adjacent the point of elevation of the top compression ring at which all the ports will be closed in such a liner, whether with respect to a two or four cycle engine. It should be understood, however, that this dividing line will be determined ultimately in certain applications with the individual cylinder being used and the area of its ultimate application.

A preferred procedure in accordance herewith for producing a dual roughness liner surface for an internal combustion engine cylinder includes first plating the metallic substrate of the cylinder bore with chromium, in well known manner. Thereafter, the entire plated surface is pre-treated, as well known in this art, to provide a porosity over the entire surface area of the plated liner within the range of between about 3–20 percent porosity, the percentage of porosity being the percent of voids appearing in the surface of the liner. This porous surface is then mechanically honed with the use of a suitable abrasive, or chemically etched, as well known to provide a finish on the lands of the entire surface of the liner of within the range of between about 0.025–0.375 microns RMS throughout the bore.

Alternatively, as well known, the metallic substrate of the cylinder bore may first be blasted mechanically by any suitable abrasive to produce the porosity and then chromium plated with the chromium plated surface thereafter being honed. The preferred range of the resulting treated liner is between about 0.375–2.0 microns RMS throughout its bore.

In this connection, whereas this invention contemplates as the preferred material for the liner to be chromium, and the preferred application method for applying the liner to be electroplating, it is to be understood that the invention also contemplates the use of other materials so long as they meet the requirement of having the appropriate qualities for adhesion to the base metal substrate of a cylinder bore, that they may be of a thickness appropriate for imparting the desired porosity and/or roughness characteristics, in accordance herewith, as well as being capable of being honed and sized, as well known, and that they possess the properties necessary for withstanding the high temperature-high pressure conditions of internal combustion engine cylinders.

For example, this invention contemplates broadly as cylinder liner materials, in addition to chromium, the use of cast iron, nickel, alloys of chromium and aluminum, nickel and chromium, nickel, chromium and aluminum, high nickel super-alloys, high cobalt super alloys, and high temperature resistant ceramic materials which may be suitably adhesion or diffusion coated to metallic substrates.

Other suitable methods for application of the liner include high temperature diffusion coating such as, by the pack method which includes embedding the cylinder liner in a powdered coating pack including a powdered source of the coating material, an inert powdered filler and a heat vaporizable halogen carrier source and heating the entire pack in a sealed retort for diffusion coating the metallic substrate with the desired coating material, together with surface treatments such as carburizing and nitriding.

It should be understood further that the term "liner" as used herein means the working surface of the bore of internal combustion engine cylinders and may include a separate liner or the metallic substrate of the bore, treated in accordance herewith.

Thereafter, a rubber covered cylindrical shield is inserted into the high pressure end of the bore, and preferably with the shield extending substantially to a circumferential line at the point where the upper compression ring is located at the instant during the cycle of movement of the piston in the cylinder when all the ports are closed. The exposed portion of the liner which is not shielded by the rubber covered cylindrical shield is then blasted to produce a finish on the lands thereof having a roughness within the range of between about 0.375–2.0 microns RMS, and preferably 0.75–1.25 microns RMS.

In this connection, it should be noted that any known method for mechanically or chemically etching the surfaces in accordance herewith may be used as long as the desired degree of roughness is achieved on the lands in the appropriate zones of the cylinder so as to produce a final cylinder bore surface the lands of which have a dual roughness in accordance herewith. The dividing line will be selected according to ultimate use but preferably the dividing line between the degrees of roughness will be substantially at that point where the upper-most compression ring, or that compression ring located closest to the high pressure end of the cylinder, is located at the instant during the cycle of movement of the piston in the cylinder when the ports thereof are closed.

It should be understood, however, that in certain instances such as in certain four-cycle engines the point will be within the range of between about 0–12.7 millimeters of the reversal point of the compression ring nearest the high pressure end of the cylinder.

As noted above, the results achieved in accordance herewith effectively compromise the dual requirements of the modern high temperature-high pressure operating internal combustion cylinder liner so as to produce enhanced wear life for such liners by having a low roughness-relatively smooth surface in the high pressure area of such cylinder liners so that the compression rings in these areas do not have a tendency to cock when subjected to high pressure in the high pressure end, merely because they slide easily over the relatively smooth surface, while the low pressure end of the cylinder has relatively a high degree of roughness for increased oil retention so as to provide an effectively lubricated surface over which the compression rings move in the low pressure area of the cylinder while simultaneously providing for effective cooling of the rings during their movement in the low pressure area to reduce the temperature thereof obtained when they are present in the high pressure portion of the cylinder. In addition, with the relative roughness of the low pressure area of the liner, the relatively moving surfaces of the compression rings and the cylinder liner in the low pressure area have a tendency to cause the surfaces of the compression and/or oil rings to be lapped during the initial break-in period so as to make them conform appropriately to the liner surfaces against which they move. In addition, in the high pressure area, because of the relatively smooth surfaces of the liner in this area, the compression rings do not have a tendency to score the liner after break-in.

As purely illustrative of internal combustion cylinder liners prepared in accordance herewith, one may note the following examples in which chromium plated cylinder liners for diesel locomotives were prepared. It is to be understood, however, that these examples are being presented with the understanding that they are to have no limiting character on the broad disclosure of the invention as generally set forth herein and as directed to men skilled in the art.

EXAMPLE I

A chromium plated 21.6 cm bore, two-cycle, 53.25 cm long cylinder liner was selected. This liner had been pre-treated to provide a 15 percent porosity, as is well known. The liner was then honed with a suitable abrasive to achieve a finish on the lands thereof within the range of about 0.125– 0.250 microns RMS throughout its bore. In this connection, as is well known, the degree of roughness as measured in microns RMS will vary slightly throughout the extent of the bore merely because of the mechanical deficiencies arising with the use of abrasives for honing such a surface, as is well known. Thereafter, a rubber shield was inserted in the upper (high pressure) end of the cylinder, with the shield extending 14.6 cm from the upper edge of the cylinder. This cylinder was then blasted in a centrifugal device, as is well known, to produce a finish on the lands in the lower (low pressure) portion of the cylinder of within the range of between about 1.0–1.25 microns RMS. The resulting liner has a low friction, low wear characteristic surface in the upper shielded portion of the liner, while having a rougher lower surface to seat the piston rings in the low pressure portion of the liner.

EXAMPLE II

A two-cycle diesel cylinder liner 21.6 cm in bore, 53.25 cm long, was plated, honed and pre-treated to provide a 3 percent porosity in the form of cavities etched into the chromium surface 0.0025– 0.020 cm deep, with 122.55 cavities per square cm. The liner bore was then polished to produce a 0.075– 0.150 micron RMS finish, as is well known. A rubber covered cylinder shield was then inserted into the upper end of the bore, and extending to a circumferential line at the point where the upper compression ring would be located, at the instant during the piston movement cycle when the exhaust ports are opened. This liner was then blasted in the unshielded portion thereof with a vapor blast to produce a 0.375– 0.500 micron RMS finish in the unshielded portion of the liner. In this connection, the procedure used to obtain the high porosity portion of the liner was achieved by the procedure described in U.S. Pat. No. 3,063,763 to Zubrisky, with the finish being known in the art as a "Matte Finish."

EXAMPLE III

The metallic substrate of a four-cycle 22.9 cm bore diesel cylinder liner, 53.25 cm long, was blasted in iron, as well known, and thereafter chromium plated and honed to the desired bore, leaving a porosity in the chromium plate of approximately 20 percent. The resulting finish on the lands between the pores of the finish was about 0.10 – 0.15 microns RMS. A rubber shield was inserted in the bore to a point 10.2 cm above the reversal point of the upper compression ring. The liner was then blasted in a centrifugal device, as well known, with aluminum oxide grit to produce a finish in the unshielded portion of the liner of within the range of between about 0.75–1.50 microns RMS. With such an arrangement, in use, the piston rings may be gently lapped on the 0.75–1.50 micron RMS finished area to conform to the liner bore, and slide with a minimum drag over the 0.10– 0.15 micron RMS finish, thus maintaining a flat ring to liner seal.

EXAMPLE IV

A worn 38.3 cm bore, 81.5 cm long, diesel power cylinder was chromium plated to provide enough thickness of chromium to allow honing to standard size within allowable tolerances, as well known. This plated bore was mechanically pitted to provide pores within the range of about 0.005– 0.010 cm deep, and with a porosity of approximately 15 percent over the entire surface area. The resulting finish had a roughness measured in microns of within the range of between about 0.025– 0.075 microns RMS. A shield was then inserted in the top (high pressure) end of the cylinder, and extending to a circumferential line a distance equal to one-fourth of the stroke, above the lowest point of travel of the upper compression ring. The lower, unshielded portion of the liner was then blasted with an aluminum oxide grit, using compressed air as the propellent, as well known, to provide a ring seating surface of within the range of about 0.875–1.25 microns RMS. As is well known in use, on one-fourth of the compression stroke, the pressure is gradually increased, thus increasing the pressure on the piston rings. During the travel of the rings over the 0.875–1.25 micron RMS surface, they are gently lapped to conform to the cylinder bore. As the piston rings continue their upward travel (toward the high pressure end of the cylinder), the pressure continues to increase. However, in this high pressure area, because of the smooth cylinder walls, the piston rings glide easily over the surface, with substantially no abrasive action. As complete conformity is achieved between the compression rings and the cylinder liner, the portion of the liner originally having the 0.875–1.25 micron RMS finish is polished by the action of the piston ring to about 0.20– 0.375 micron RMS and no further significant abrasion will occur between the ring and the liner.

As further exemplary of the invention in accordance herewith, 16 cylinder liners prepared in accordance with the Example No. I noted above were installed in Locomotive No. 576 of the Louisville and Nashville Railroad and load tested with a load box. This locomotive is a Model GP–35 Locomotive with a 2,500 horsepower D type 15 port liner equipped with Koppers Piston Ring Set No. 57179A80. The locomotive was run in lower throttle position for 5–6 hours, and thereafter 1 hour in No. 8 throttle position after which time the engine was shut down.

An air box inspection revealed all of the piston rings seating very well and showed approximately 0.0024 cm of seating surface on the face of all the compression rings. The air box was dry and showed no signs of lube oil being pumped through the liner ports. Also, after checking the oil level on the crankcase with the oil dip stick there was no signs of oil consumption during this load box test. Furthermore, the piston rings all showed seating in the port area of the engine cylinder liners.

Accordingly, and as will be apparent from the foregoing, there are provided in accordance herewith, methods for producing liners for internal combustion engine cylinders having the appropriate characteristics for compromising the dual requirements necessary for such cylinder liners of high oil retention characteristics and high land roughness in the low pressure regions of the liner, and smooth surfaces and low land roughness characteristics in the high pressure end of the liner so as to provide a relatively coarse land surface in the low pressure regions for providing conformity of the compression ring surfaces with the liner surfaces against which they move while simultaneously providing a relatively smooth liner land surface in the high pressure area so as to reduce cocking of the compression rings when they are subjected to increasing pressures in the high temperature area.

Low oil retention is maintained in the high pressure regions so as to reduce lubrication oil burning adjacent the combustion area of the cylinder while simultaneously providing high lubrication oil retention in the low pressure region in order to provide cooling of the heated compression rings as they move from the high temperature-high pressure region of the cylinder to the low pressure-low temperature region of the cylinder.

In addition, cylinder liners are provided, in accordance herewith, which have the characteristics noted above for giving the desired characteristics in different areas of the internal combustion engine cylinder even though those characteristics are completely adverse to each other. Furthermore, the cylinder liners in accordance herewith have a wide range of application and because they provide increased wear life and considerably reduced lubricating oil consumption the methods of producing the liners in accordance herewith and the liners produced thereby are highly advantageous commercially.

While the methods and apparatus herein disclosed form preferred embodiments of this invention, this invention is not limited to those specific methods and apparatus, and changes can be made therein without departing from the scope of this invention which is defined in the appended claims.

What is claimed is:

1. In a method for producing a liner surface for an internal combustion engine cylinder bore, the steps which comprise disposing on said surface a liner material, imparting to said liner material a first degree of roughness over the entire surface extent of said material, forming a shield over the portion of said material disposed adjacent the high pressure end of said bore, said shielded portion extending from the high pressure end of said bore to a circumferential line adjacent the point at which the compression ring most closely adjacent the high pressure end of the said cylinder bore will be substantially at the moment during a cycle of movement of a piston in said cylinder when all ports thereof are closed, and imparting a second degree of roughness over that portion of the said material not shielded during said forming step, said second degree of roughness being more rough than said first degree.

2. In a method for producing a liner surface for an internal combustion engine cylinder bore, the steps which comprise electroplating on said surface a liner material of chromium, imparting to said liner material a first degree of roughness over the entire surface extent of said material by blasting said chromium surface with an abrasive, said first degree of roughness being within the range of between about 0.025 – 0.375 microns root mean square, forming a shield over the portion of said material disposed adjacent the high pressure end of said bore, and imparting a second degree of roughness over that portion of the said material not shielded during said forming step, said second degree of roughness being more rough than said first degree.

3. A method as described in claim 2 in which said first degree of roughness is within the range of between about 0.075–0.250 microns root mean square.

4. A method as described in claim 2 in which said imparting step for obtaining said second degree of roughness includes blasting said chromium liner surface not shielded by said forming step with an abrasive for a period of time necessary so that said second degree of roughness is within the range of between about 0.375–2.0 microns root mean square.

5. A method as described in claim 4 in which said second degree of roughness is within the range of between about 0.750–1.25 microns root mean square.

6. A method as described in claim 2 in which said imparting step for obtaining said second degree of roughness includes vapor blasting said chromium liner surface not shielded by said forming step for a period of time necessary so that said second degree of roughness is within the range of between about 0.375–2.0 microns root mean square.

7. A method as recited in claim 6 in which said second degree of roughness is within the range of between about 0.750–1.25 microns root mean square.

* * * * *